(12) United States Patent
Schmidt et al.

(10) Patent No.: US 8,786,678 B2
(45) Date of Patent: Jul. 22, 2014

(54) 3D TIME-OF-FLIGHT CAMERA AND METHOD

(75) Inventors: Mirko Schmidt, Heidelberg (DE); Klaus Zimmermann, Deizisau (DE)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 13/343,444

(22) Filed: Jan. 4, 2012

(65) Prior Publication Data

US 2012/0176476 A1      Jul. 12, 2012

(30) Foreign Application Priority Data

Jan. 12, 2011   (EP) ..................................... 11150708

(51) Int. Cl.
*H04N 13/02*   (2006.01)
(52) U.S. Cl.
USPC ............................................................ 348/46
(58) Field of Classification Search
CPC ......... G01S 17/00; G01S 17/89; H04N 5/225; H04N 5/2256
USPC ..................................................... 348/42, 46
See application file for complete search history.

(56) References Cited

U.S. PATENT DOCUMENTS

| | | | |
|---|---|---|---|
| 5,751,830 A | 5/1998 | Hutchinson | |
| 2004/0008394 A1* | 1/2004 | Lange et al. | ................. 359/237 |

FOREIGN PATENT DOCUMENTS

WO    WO 2009/077378 A1    6/2009

OTHER PUBLICATIONS

U.S. Appl. No. 13/273,776, filed Oct. 14, 2011, Schmidt et al.
Extended European Search Report issued Mar. 20, 2012 in patent application No. 11193872.6.
O. Elkhalili, et al., "A 64×8 Pixel 3-D CMOS Time of Flight Image Sensor for Car Safety Applications", Solid-State Circuits Conference, Proceedings of the $32^{nd}$ European, IEEE, XP031046978, Sep. 1, 2006, pp. 568-571.
Stephan Hussmann et al., "Pseudo-Four-Phase-Shift Algorithm for Performance Enhancement of 3D-TOF Vision Systems", IEEE Transactions on Instrumentation and Measurement, vol. 59, No. 5, May 2010, pp. 1175-1181.
Michael Erz et al., "Radiometric and Spectrometric Calibrations, and Distance Noise Measurement of ToF Cameras", $3^{rd}$ Workshop on Dynamic 3-D Imaging, Lecture Notes in Computer Science, vol. 5742, Springer, 2009, pp. 28-41.
Mario Frank et al., "Theoretical and Experimental Error Analysis of Continuous-Wave Time-Of-Flight Range Cameras", Optical Engineering, vol. 48, No. 1, Jan. 2009, pp. 013602-1-013602-16.

(Continued)

*Primary Examiner* — Huy T Nguyen
(74) *Attorney, Agent, or Firm* — Oblon, Spivak, McClelland, Maier & Neustadt, L.L.P.

(57) ABSTRACT

3D time-of-flight camera and a corresponding method for acquiring information about a scene. To increase the frame rate, the proposed camera comprises a radiation source, a radiation detector comprising one or more pixels, wherein a pixel comprises two or more detection units each detecting samples of a sample set of two or more samples and an evaluation unit that evaluates said sample sets of said two or more detection units and generates scene-related information from said sample sets. Said evaluation unit comprises a rectification unit that rectifies a subset of samples of said sample sets by use of a predetermined rectification operator defining a correlation between samples detected by two different detection units of a particular pixel, and an information value calculator that determines an information value of said scene-related information from said subset of rectified samples and the remaining samples of the sample sets.

18 Claims, 7 Drawing Sheets

(56) References Cited

OTHER PUBLICATIONS

S. Burak Gokturk et al., "A Time-Of-Flight Depth Sensor—System Description, Issues and Solutions", Computer Vision and Pattern Recognition Workshop, 2004, CVPRW '04, 9 Pages.

T. Kahlmann et al., "Calibration for Increased Accuracy of the Range Imaging Camera SwissRanger™", International Archives of Photogrammetry, Remote Sensing and Spatial Information Sciences, ISPRS Commission V Symposium 'Image Engineering and Vision Metrology', XXXVI(5), 2006, pp. 136-141.

Robert Lange, "3D Time-of-Flight Distance Measurement with Custom Solid-State Image Sensors in CMOS/CCD-Technology", PhD thesis, Department of Electrical Engineering and Computer Science at University of Siegen, 2000, 217 Pages.

Marvin Lindner et al., "Lateral and Depth Calibration of PMD-Distance Sensors", International Symposium on Visual Computing (ISVC06), vol. 2, Springer, 2006, 10 Pages.

Marvin Lindner et al., "Calibration of the Intensity-Related Distance Error of the PMD TOF-Camera", © 2007 SPIE—The International Society for Optical Engineering, Proc. SPIE 6764, 6764-35, 2007, 8 Pages.

Thierry Oggier et al., "An All-Solid-State Optical Range Camera for 3D Real-Time Imaging with Sub-Centimeter Depth Resolution (SwissRanger™)", Optical Design and Engineering, Proceedings of SPIE, vol. 5249, 2004, 12 Pages.

Matthias Plaue, "Technical Report: Analysis of the PMD Imaging System", Interdisciplinary Center for Scientific Computing, Univ. of Heidelberg, 2006, pp. 1-29.

Holger Rapp, "Experimental and Theoretical Investigation of Correlating TOF-Camera Systems", Diploma Thesis for the Faculty for Physics and Astronomy, Univ. of Heidelberg, 2007, 80 Pages.

Dr.-Ing. Thorsten Ringbeck et al., "A 3D Time of Flight Camera for Object Detection", Optical 3-D Measurement Techniques, Plenary Session 1: Range Imaging 1, Jul. 9-12, 2007 ETH Zürich, 10 Pages.

Mirko Schmidt et al., "A Physical Model of Time-of-Flight 3D Imaging Systems, Including Suppression of Ambient Light", $3^{rd}$ Workshop on Dynamic 3-D Imaging, vol. 5742 of Lecture Notes in Computer Science, Springer, 2009, 15 Pages.

R. Schwarte et al., "An New Active 3D-Vision System Based on rf-Modulation Interferometry of Incoherent Light", Society of Photo-Optical Instrumentation Engineers (SPIE) Conference Series, vol. 2588, Oct. 1995, 10 Pages.

T. Spirig et al., "The Lock-In CCD-Two-Dimensional Synchronous Detection of Light", IEEE Journal of Quantum Electronics, vol. 31, No. 9, Sep. 1995, pp. 1705-1708.

G. Yahav et al., "3D Imaging Camera for Gaming Application", International Conference on Consumer Electronics, ICCE 2007, Digest of Technical Papers, 2006, 2 Pages.

* cited by examiner

3D TIME-OF-FLIGHT CAMERA AND METHOD

CROSS-REFERENCE TO RELATED APPLICATIONS

The present application claims priority of European patent application 11 150 708.3 filed on Jan. 12, 2011.

FIELD OF THE INVENTION

The present invention relates to a 3D time-of-flight camera and a corresponding 3D time-of-flight method for acquiring information about a scene, in particular for acquiring depth images of a scene, information about phase shifts between a reference signal and incident radiation of a scene or environmental information about the scene. Further, the present invention relates to a processor and a corresponding processing method for use in such a 3D time-of-flight camera and method. Still further, the present invention relates to a computer program for implementing such a processing method on a computer and a computer readable non-transitory medium storing such a computer program.

BACKGROUND OF THE INVENTION 3D time-of-flight (ToF) cameras acquire depth images by determining the time which radiation, preferably light, needs from a source to an object and back to the camera. This is often done by illuminating the scene discontinuously and applying a convolution of a temporal window (strictly speaking: a sequence of windows) to the backscattered incident optical signal. Continuous-wave ToF cameras illuminate the scene using a periodically modulated light-source, and measure the phase shift of the backscattered signal relative to the emitted signal. This phase shift is proportional to the time-of-flight, so it contains the distance information. Typically, three quantities are unknown and have to be determined for each pixel individually: the object's distance, its reflectivity and the intensity of ambient light. Therefore, one or more (dependent on the number of unknowns) measurements, for instance at least three measurements in case of three unknowns, are necessary to determine these unknowns.

A Continuous-wave ToF sensor (PMD sensor) is described in Schwarte, R., Heinol, H. G., Xu, Z., Hartmann, K.: New active 3D vision system based on rf-modulation interferometry of incoherent light, in Casasent, D. P. (ed.) Society of Photo-Optical Instrumentation Engineers (SPIE) Conference Series, vol. 2588, pp. 126-134 (1995) and in Spirig, T., Seitz, P., Heitger, F.: The lock-in CCD. Two-dimensional synchronous detection of light. IEEE J. Quantum Electronics 31, 1705-1708 (1995).

More information about the general technology of ToF cameras can be found in Elkhalili, O., Schrey, O., Ulfig, W., Brockherde, W., Hosticka, B. J., Mengel, P., Listl, L.: A 64×8 pixel 3-D CMOS time-of flight image sensor for car safety applications (2006), in Gokturk, S. B., Yalcin, H., Bamji, C.: A time-of-flight depth sensor—System description, issues and solutions, in http://www.canesta.com/assets/pdf/technicalpapers/CVPR_Submission_TOF.pdf, and in Oggier, T., Lehmann, M., Kaufmann, R., Schweizer, M., Richter, M., Metzler, P., Lang, G., Lustenberger, F., Blanc, N.: An all-solid-state optical range camera for 3D real-time imaging with sub-centimeter depth resolution (2004), Proceedings of SPIE 2003, pp. 534-545, 2003, and in Ringbeck, T., Hagebeuker, B.: A 3D time-of-flight camera for object detection, Optical 3-D Measurement Techniques 09-12.07.2007 ETH Zurich, Plenary Session 1: Range Imaging I.

Many known TOF cameras (e.g. as described in the above cited disclosure of Ringbeck, T. et al.) use a special sensor, which employs two quantum wells per pixel to measure the correlation function of a detection signal representing the detected radiation (in particular light) with an electronic reference signal. Incident photons generate electrons, they are sorted by a switch into these two quantum wells, converted into a voltage, amplified, and given out as two digital values (also called "samples"). The switch is synchronized with the light source, thus the two digital values correspond to two samples of the correlation function shifted by 180° against each other. By delaying the reference signal by a certain angle $\Theta$, the sensor is able to sample arbitrary points of the correlation function. Typically, $\Theta$ is chosen as $\{0°, 90°, 180°, 270°\}$, the data acquired by both quantum wells A and B correspond to $\Theta$ and $\Theta+180°$, respectively. This gives eight samples $A\_0, A\_90, A\_180, A\_270$ and simultaneously acquired $B\_180, B\_270, B\_0, B\_90$. Thus, each point $\Theta$ is sampled twice (e.g. $A\_0$ and $B\_0$). The reason for that is the need for compensating sensor inhomogeneities since the quantum wells A and B and their amplification paths do not respond equally to radiation. An averaging of the eight samples is then used to obtain one value of the phase shift and therefrom one value of the distance.

BRIEF SUMMARY OF THE INVENTION

It is an object of the present invention to provide a 3D time-of-flight camera and a corresponding 3D time-of-flight method by which a desired information about a scene can be acquired from less samples leading to an increased frame rate and enabling real-time applications. It is a further object of the present invention to provide a processor and a corresponding processing method as well as a corresponding computer program for implementing said processing method and a computer readable non-transitory medium.

According to an aspect of the present invention there is provided a 3D time-of-flight camera for acquiring information about a scene, in particular for acquiring depth images of a scene, information about phase shifts between a reference signal and incident radiation of a scene or environmental information about the scene, said camera comprising:

a radiation source that generates and emits electromagnetic radiation for illuminating said scene, a radiation detector that detects electromagnetic radiation reflected from said scene, said radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, and an evaluation unit that evaluates said sample sets of said two or more detection units and generates scene-related information from said sample sets, wherein said evaluation unit comprises a rectification unit that rectifies a subset of samples of said sample sets by use of a predetermined rectification operator defining a correlation between samples detected by two different detection units of a particular pixel, and an information value calculator that determines an information value of said scene-related information from said subset of rectified samples and the remaining samples of the sample sets.

According to a further aspect of the present invention there is provided a processor for use in a 3D time-of-flight camera for acquiring information about a scene, in particular for acquiring depth images of a scene, information about phase shifts between a reference signal and incident radiation of a scene or environmental information about the scene, said 3D time-of-flight camera comprising a radiation source that generates and emits electromagnetic radiation for illuminating said scene, and a radiation detector that detects electromagnetic radiation reflected from said scene, said radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, said processor being operable to evaluate said sample sets of said two or more detection units and generates scene-related information from said sample sets, wherein said processor comprises a rectification unit that rectifies a subset of samples of said sample sets by use of a predetermined rectification operator defining a correlation between samples detected by two different detection units of a particular pixel, and an information value calculator that determines an information value of said scene-related information from said subset of rectified samples and the remaining samples of the sample sets.

According to further aspects of the present invention a 3D time-of-flight method for acquiring depth images of a scene and a processing method are provided. According to still further aspects a computer program comprising program means for causing a computer to carry out the steps of the processing method according to the present invention, when said computer program is carried out on a computer, as well as a computer readable non-transitory medium having instructions stored thereon which, when carried out on a computer, cause the computer to perform the steps of the processing method according to the present invention are provided.

Further preferred embodiments of the invention are defined in the dependent claims. It shall be understood that the claimed methods, the claimed computer program and the claimed computer readable medium have similar and/or identical preferred embodiments as the claimed 3D time-of-flight camera and as defined in the dependent claims.

The present invention is based on the idea to use inhomogeneity parameters, e.g. obtained from an implicit real-time estimation, expressed by a rectification operator for the correction of acquired samples of a correlation function. Thus, the effect of different characteristic curves of different detection units (also called taps) of a pixel is compensated. The conventionally used averaging technique is thus no longer needed. This enables the computation of scene-related information, e.g. the phase shift for determining the distance of an object of the scene, with fewer samples and without additional systematic errors. Further, this enables, for instance, the computation of multiple independent depth maps for each set of a predetermined number of raw samples per pixel, resulting in an increased frame rate.

According to the invention the sample sets of the detection units are evaluated to generate the desired scene-related information. For this purpose subsets of samples of said sample sets are formed, and the samples of this subset are rectified by use of a predetermined rectification operator that defines a correlation between samples detected by two different detection units of a particular pixel. An information value of said scene-related information is then determined from said subset of rectified samples and the remaining samples of the sample sets, preferably from said subset of rectified samples and the remaining samples of the same sample set, from which the samples of the subset have been taken.

The present invention is preferably applied for acquiring depth images of the scene. For such kinds of applications said evaluation unit is operable to generate scene-related information about the distance of one or more objects of the scene, the reflectivity of one or more objects of the scene and/or the intensity of non-modulated radiation (including ambient radiation, in particular ambient light), i.e. said scene-related information may be a distance information, a reflectivity information and/or an intensity information of the background radiation.

The invention may, however, also be applied in other applications, e.g. for acquiring information about phase shifts of a scene or environmental information about the scene. Such other applications include Fluorescence Lifetime Imaging (FLIM), e.g. multitap FLIM, where the phase shift of a specimen is measured using a microscope, and applications to estimate environmental parameters (e.g. temperature, oxygen concentration, etc.). Also applications using pressure sensitive paint (PSP) may benefit from the invention.

While generally a wide range of electromagnetic radiation is generally available for use with the invention, i.e. the invention may be used in different kinds of applications using different kinds of radiation, the invention is preferably applied for use infrared, visible or ultraviolet light. Generally, the radiation source and radiation detector are accordingly adapted for the kind of used radiation. If necessary, appropriate converters (in the detector or in addition to the detector) are used for conversion of detected radiation into a preferred wavelength range for further processing and evaluation.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
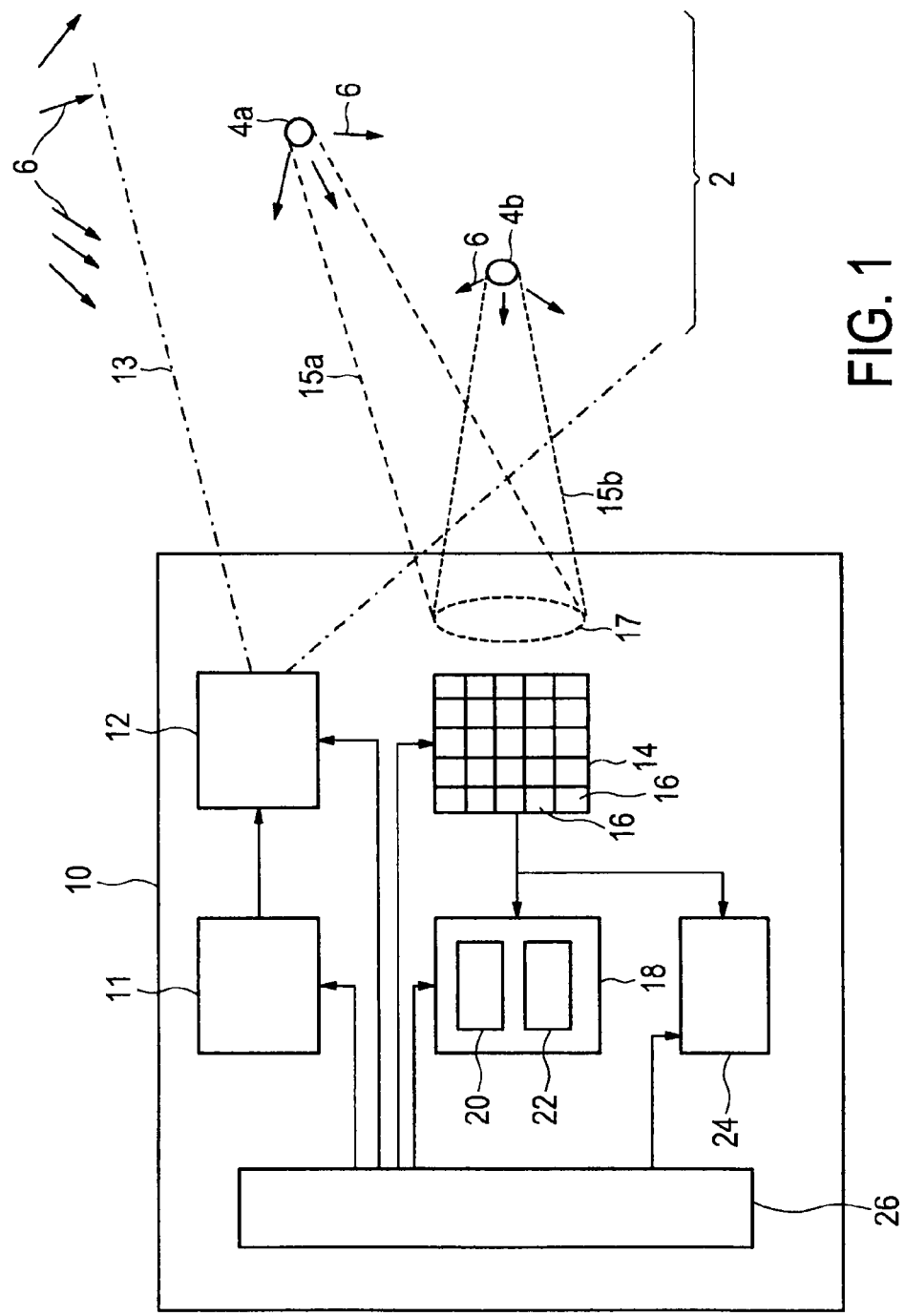
FIG. 1 shows a schematic diagram of a 3D ToF camera according to the present invention.

A schematic diagram of the general layout of a 3D ToF camera 10 according to the present invention is shown in FIG. 1. Such a camera 10 is generally used for acquiring information about a scene 2. Such information may particularly comprise information for generating depth images of a scene, information about phase shifts of a scene or environmental information about the scene. The following description will, as an example, focus on the acquisition of depth images, in particular on the acquisition of distance information about the distance of one or more objects, in the embodiment shown in FIG. 1 a background object 4a and a foreground object 4b, of the scene 2 from the camera 10. This distance information is, besides the reflectivity of one or more objects 4 of the scene 2 and the intensity of non-modulated radiation (which includes ambient light and non-modulated light emitted by the radiation source) 6, one of the three unknown factors to be determined to be able to generate depth images of the scene 2.

The camera 10 comprises a radiation source 12 that generates and emits electromagnetic radiation 13 for illuminating said scene 2 and a radiation detector 14 that detects electromagnetic radiation 15 reflected from said scene 2. The radiation source 12 is, in this embodiment, controlled by a source controller (or driver) 11, which may, in other embodiments, be included in the source 12. Said radiation detector 14 comprises one or more pixels 16, in particular a two-dimensional array of pixels, wherein said one or more pixels 16 individually detect electromagnetic radiation 15a, 15b reflected from said scene 2 (more precisely, from the objects 4a, 4b of the scene). Said pixels each comprise two or more detection units each detecting samples of a sample set of two or more samples, as will be explained in more detail below.

The radiation detector 14 comprises means which cause that the measured pixel signals depend on the temporal delay between the incident radiation signal and a reference signal. This ability is an important component of ToF systems. For pulsed ToF systems, this might be a variation of measured intensities, caused by a shutter (which may be part of the detector (e.g. an electronical shutter) or embodied as an additional element located between detector 14 and scene 2 (e.g. a physical shutter)). In continuous-wave ToF systems, such temporal delay is interpreted as a phase shift between the incident radiation signal and an electronic reference signal. From that temporal delay, it is possible to measure the time which the radiation needs from source 12 to object 4a and from the object to the detector 14. Analogously the time from source 12 to object 4b and from the object to the detector 14 may be measured. In depth imaging it is assumed that there is no delay between irradiating the objects 4a and 4b, and its optical responses. So from the known speed of the radiation (which is the speed of light in the surrounding environment) and the measured time which the radiation needs to cover the distance from the source 12 via the objects 4a and 4b to detector 14, the distance of the objects may be computed.

In FLIM (Fluorescence Lifetime Imaging) applications the distance of the objects is known (or negligible, or measured additionally), but the response delay (between the light hitting the objects 4a and 4b, respectively, and the emission of light by these objects, being detected by detector 14) is unknown and has to be measured. Depending on the objects' characteristics (possibly modified by dyes), this temporal delay provides information about environmental parameters (like local oxygen concentration, temperature, etc.). It should be noted here that radiation reflected from objects 4a and 4b is generally not mixed onto a single pixel, but the optics ensure that different points in the object space are imaged by different pixels. If two objects are imaged by a single pixel, this pixel measures erroneous values leading to artifacts (flying pixel), which is not dealt with by the present invention. For example, a depth edge between an object in the foreground and one in the background would lead to such artifacts: The depth values measured at the edge are typically neither estimated as foreground, nor as background depth, but something else.

Optional means, such as optical lenses, focusing elements etc., may be provided in addition, in particular for forming the radiation beam 13 for illuminating the scene 2 and/or for focusing the reflected radiation 15 onto the radiation detector 14. For instance, as shown in FIG. 1, an optical lens 17 and a band pass filter may be provided in front of the radiation detector 14 for collecting the reflected radiation and for letting only reflected radiation pass onto the detector 14 having the same wavelength as the illuminating radiation 13.

Preferably, infrared light is used for illumination and for detection, but also visible light or UV light or other electromagnetic radiation may be used according to the present invention. Generally, the used radiation may be selected from the wavelength range between 0.1 nm and 1 cm, in particular between 10 nm and 1 mm.

The emitted radiation may be continuously emitted (e.g. sinusoidally modulated), or may be pulsed. A typical case is to use a burst mode, in which the radiation source is driven continuously (e.g. with a sinusoidal excitation function), but only during the acquisition of samples. At other times, it is switched off to allow the radiation source to cool down and to keep the average intensity at minimum (eye safety reasons). So over large time scales, it is actually not really continuous.

In any case, the detector and the subsequent processing of the acquired pixel signals are then appropriately adapted. Both principles—continuously emitted radiation and pulsed radiation—are generally known for use in 3D ToF cameras, e.g. from various types of 3D ToF cameras on the market (e.g. the Z-Cam (3DV Systems, Israel) as an example using pulsed radiation and the PMD CamCube (PMDTechnologies, Germany) or Swissranger SR4000 (Mesa Imaging, Switzerland) as examples using continuous radiation). The usage of non-periodical irradiation is also possible, as described in Buettgen, B.; Mechat, M.-A. E.; Lustenberger, F. & Seitz, P. "Pseudonoise optical modulation for real-time 3-D imaging with minimum interference", IEEE TRANSACTIONS ON CIRCUITS AND SYSTEMS I-REGULAR PAPERS, IEEE-INST ELECTRICAL ELECTRONICS ENGINEERS INC, {2007}, {54}, {2109-2119}. When using pulsed radiation depth information can be obtained from the intensity of the reflected radiation, while when using continuous radiation, a depth information can be obtained from phase differences in the reflected radiation. Since these principles are generally known no further details are provided here.

The camera 10 further comprise an evaluation unit 18 that evaluates said sample sets of said two or more detection units of the radiation detector 14 and generates scene-related information from said sample sets. Said scene-related information may, as mentioned above, be a depth information, phase shift information, environmental information, etc. Here, it will be focused on the generation of depth information as an example. The present invention and the elements explained hereinafter with reference to the figures may, however, similarly or identically be applied for the generation of other information as well.

In an embodiment the evaluation unit 18, which may be implemented as a processor, e.g. a programmable microprocessor or a computer, or as dedicated hardware, comprises a rectification unit 20 that rectifies, generally for each of the two or more detection units of each pixel, a subset of samples of a sample set by use of a predetermined rectification operator defining a correlation between samples detected by two different detection units of a particular pixel. Further, the evaluation unit 18 comprises an information value calculator 22 that determines, generally for each pixel, an information value of said scene-related information from said subset of rectified samples and the remaining samples of the sample sets.

In an embodiment, the camera 10 further comprises a rectification operator generator 24 that generates said rectification operator by fitting a polynomial fit, in particular of degree 0, 1 or 2, to pairs of samples detected by two different detection units of a particular pixel, in particular samples of substantially static areas of the scene. Preferably, said rectification operator generator 24 generates said rectification operator by fitting a polynomial fit, in particular of degree 0, 1 or 2, to pairs of samples detected for identical sampling modes of two different detection units of a particular pixel. This generation of the rectification operation will be explained below in more detail.

Further, in an embodiment a control unit 26 is provided that temporarily disables the camera 10 to measure different quantities by said detection units, in particular by controlling said radiation source 12, the sampling mode of the detection units, the synchronization between the radiation source and the detection units, and/or a radiation path of radiation incident at the radiation detector. In the most general case, said control unit 26 is able to control all elements of the camera 10.

As explained above, 3D Time-of-Flight (ToF) cameras acquire depth images by determining the time which emitted electromagnetic radiation needs from a source to an object and back to the camera. Phase-based (continuous-wave) and pulse-based ToF systems have been developed. Pulse-based ToF systems emit a multitude of discrete radiation pulses and measure the time t until the backscattered pulses are detected by the camera. Continuous-wave ToF cameras irradiate the scene using a periodically modulated light-source, and measure the phase shift of the backscattered signal relative to the emitted signal. This phase shift is proportional to the time of flight t.

The time t is proportional to the distance the radiation traveled from the source to the object and back to the camera. If the radiation source is located near the camera, the object's distance z may be computed as:

$$z = \frac{t \cdot c}{2} \tag{1}$$

and $$z = \frac{\varphi \cdot c}{4 \cdot \pi \cdot v}$$

with φ being the measured phase shift, c being the speed of light, and v being the modulation frequency of the light source.

Figure 2:
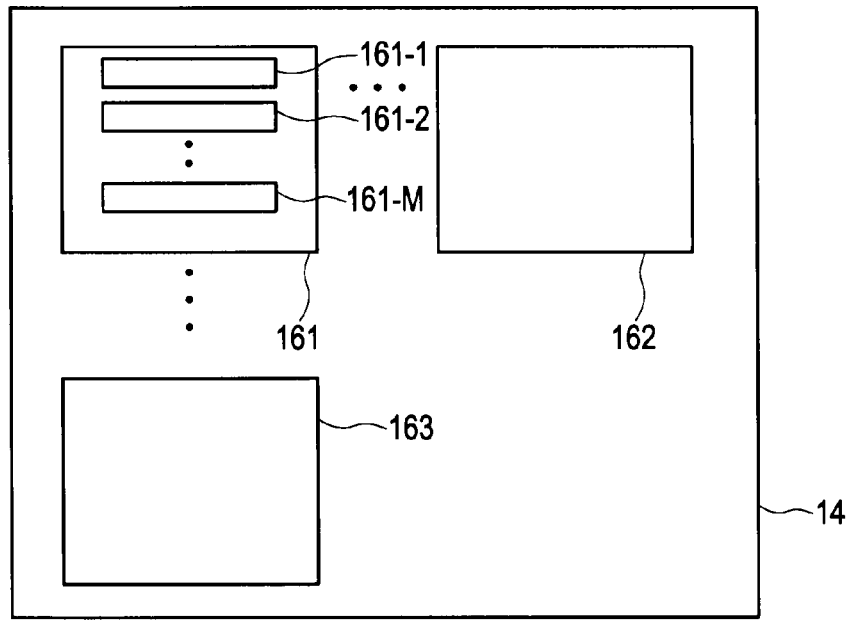
FIG. 2 shows a schematic diagram of an embodiment of radiation detector according to the present invention for use in such a 3D ToF camera.

Both approaches—continuous-wave as well as pulse-based ToF—measure incident irradiances during certain time windows. To measure these, ToF systems use radiation detectors with pixels, each pixel typically having at least two detection units of which the sensitivity can be varied over time using a reference signal. To ensure a high effectiveness of the measurement process, a multitude of such detection units 161-1, 161-2, . . . , 161-M is typically combined in a pixel 161 as shown in FIG. 2 depicting such a radiation detector 14 comprising a multitude of pixels, 161, 162, 163, . . . , while also pixels using one of such detection units are feasible. The number of detection units per pixel will be denoted as M. A ToF sensor (i.e. the radiation detector 14) typically comprises a multitude of such pixels 16, but also sensors using only a single pixel are feasible.

Typically, the emitted radiation signal and the reference signal are periodical, but also systems using non-periodical signals have been demonstrated. If periodical signals are used, the base frequencies of reference signal and light signal are typically set to identical values (homodyne ToF systems), but also systems using different frequencies exist (heterodyne ToF systems).

By synchronizing the reference signal and the radiation source signal driven at equal base frequencies, the value determined by a single detection unit corresponds to a sample of the cross-correlation function of reference and radiation source signal. By introducing an additional, controllable phase shift θ between both signals, it is possible to sample the cross-correlation function at various angles θ.

ToF systems sample a multitude of N samples (herein called "sample set") by each detection unit. A sufficient number of samples enables the computation of unknown quantities of the imaged scene. So, for instance the phase shift φ between reference and light source signal may be determined, enabling the computation of the objects distance (see equation (1)).

N should be equal or greater than the number of unknown quantities to be estimated. For instance, in a typical setup for measuring depth maps, besides the phase shift φ also the amplitude $a_1$ and the intensity of non-modulated light $a_0$ are unknown. Therefore at least three samples are necessary to determine them. Typically, N=4 is chosen, because of a simpler numerical reconstruction of the unknowns and better noise performance.

In the following, an example for the reconstruction of information describing the scene, in particular depth information as acquired in depth imaging, will be explained. The correlation function I of a rectangular reference function and a sinusoidal light source function may be derived as $$I = a_0 + a_1 \cos(\theta + \phi).$$

By applying four delays $$\theta = \{0°, 90°, 80°, 270°\}$$

four samples of the correlation function ($I_1, \ldots, I_4$) may be determined. From these samples the unknown may be computed as $$a_0 = \frac{I_1 + I_2 + I_3 + I_4}{4} \tag{2}$$

$$a_1 = \frac{[(I_4 - I_2)^2 + (I_3 - I_1)^2]^{1/2}}{2}$$

$$\varphi = \arctan\left(\frac{I_4 - I_2}{I_3 - I_1}\right)$$

From φ the distance z may be determined using equation (1). This is done for each pixel individually, enabling the computation of dense depth maps.

As mentioned above, ToF sensors typically use pixels which comprise a multitude of M detection units. Since each of these detection units acquires a different sample, M samples may be acquired in parallel. Such a parallel acquisition of M samples will be called subframe in the following.

Figure 3:
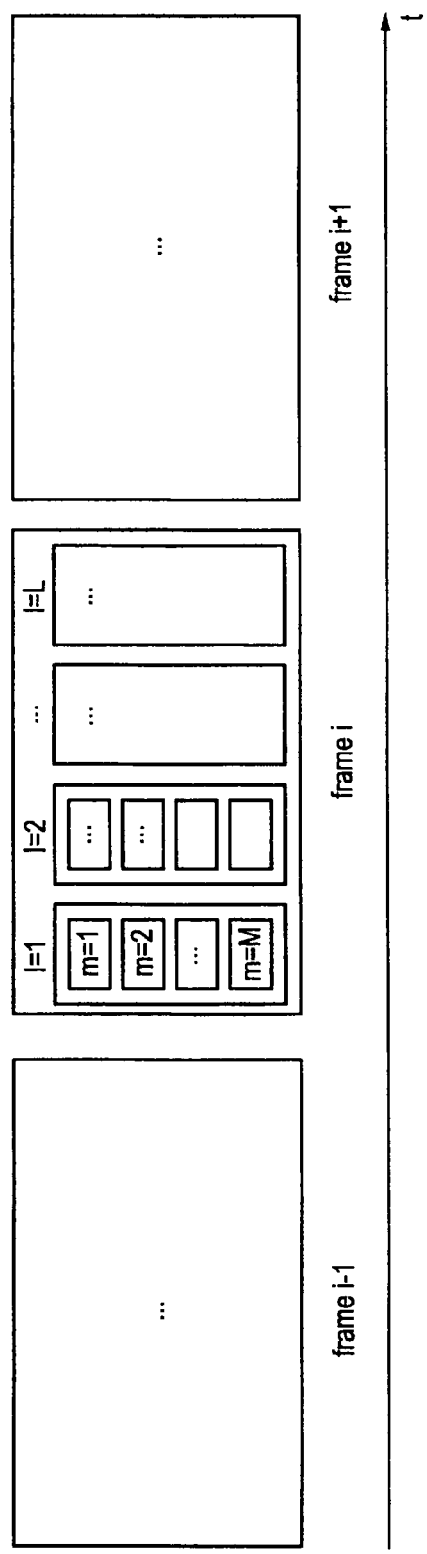
FIG. 3 shows three frames of samples acquired by such a radiation detector.

If N>M, multiple subframes are necessary. In general, L subframes are acquired and used for the computation of the unknown quantities. Such set of L subframes builds a frame f as shown in FIG. 3. If N>=M, L=rounding up (N/M) subframes theoretically suffice. If N<M, only $M_{used}$=min (M, N) detection units would be necessary to acquire all needed samples and L=1 subframe would suffice.

However, today's ToF systems suffer from inhomogeneous characteristics of the different detection units: The characteristic curve of each detection unit is different, i.e. the quantity given out as measurement value for a specific theoretically measured value c (e.g. sample of the correlation function $I_i$) is different for each detection unit. The direct usage of such raw values measured by detection units with different characteristic curves would lead to strong errors in the reconstruction of the unknown scene parameters (such as the phase shift ($\phi$)).

One method to prevent such errors is to perform each of the N measurements with each of the M detection units separately (i.e. L=M). Then, the arithmetic average over all detection units M is computed and used for the reconstruction of the unknown quantities. This method is able to cancel out inequalities of the characteristic curves. However, only inequalities up to linear order may be compensated. Furthermore, it is to be noted that L>=M subframes are necessary to acquire the data necessary for reconstruction the unknown quantities. Even sophisticated sensors with many parallel detection units (bigger M) would thus not enable a faster acquisition process.

Next, an example for the commonly used averaging technique shall be explained. Sensors used, for instance, by PMDTechnologies employ M=2 detection units per pixel. To acquire N=4 samples of the correlation function I, L=rounding up (4/2)=2 subframes would suffice. To prevent the above mentioned errors, L=4 subframes are acquired, leading to eight measured values. For $\theta=\{0°, 90°, 180°, 270°\}$ and the taps ("detection units") named A and B, these measured values ("samples") are called $A_0$, $B_0$, $A_{90}$, $B_{90}$, $A_{180}$, $B_{180}$, $A_{270}$, $B_{270}$ (the lower indices represent the chosen phase shift $\theta$ (in degree [°])). Here, the samples $A_0$, $A_{90}$, $A_{180}$, $A_{270}$ acquired by the detection unit A form a first sample set and the samples $B_0$, $B_{90}$, $B_{180}$, $B_{270}$ acquired by the detection unit B form a second sample set.

Then the intermediate quantities are computed as $$I_0=(A_0+B_0)/2,$$

$$I_{90}=(A_{90}+B_{90})/2,$$

$$I_{180}=(A_{180}+B_{180})/2,$$

$$I_{270}=(A_{270}+B_{270})/2,$$

which corresponds to arithmetically averaging the raw data. These intermediate quantities are used for computing the phase shift $\phi$, $a_0$ and $a_1$ using the formulas (2), e.g. $\phi$=arc-tan $[(I_{270}-I_{90})/(I_{180}-I_0)]$.

It shall be noted that the present invention applies to multi-tap sensors (M>1). It applies to phase-based and pulse-based ToF. It applies to depth imaging, FLIM, and all other applications performed with such sensors. Since the invention improves the sensors raw data, it is independent of the application.

In general, the problem underlying the present invention can be formulated as follows: Each detection unit m (m$\in\{1, \ldots, M\}$) measures in each acquisition process (subframe) l (l$\in\{1, L\}$) a certain sampling mode n (n$\in\{1, \ldots, N\}$) a (theoretical) value $c_{n,m}$ (sample) and determines an output value $d_{n,m}$. In practice, this process cannot be implemented perfectly. It may be modeled as a non-linear distortion:

$$c_{n,m} \rightarrow \text{nonlin}_{n,m} \rightarrow d_{n,m} \quad (2.1)$$

The present invention proposes to correct the output data $d_{n,m}$ as $$c_{n,m} \rightarrow \text{nonlin}_{n,m} \rightarrow d_{n,m} \rightarrow \text{correct}_{n,m} \rightarrow d'_{n,m}$$

with $d'_{n,m}$ being the corrected measurement value of $c_{n,m}$. The proposed correction achieves that the corrected output value $d'_{n,m}$ does only depend on the theoretical (input) value $c_{n,m}$, and is not any longer dependent on the detection unit m or the sampling mode n used for the measurement. Thus $$c_{n1,m1}=c_{n2,m2}=>d'_{n1,m1}=d'_{n2,m2} \quad (3)$$

for all n1, n2$\in\{1, \ldots, N\}$ and m1, m2$\in\{1, \ldots, M\}$.

One possibility for determining an appropriate correction would be to perform an explicit calibration of the ToF system. This necessitates means to generate a well-defined input $c_{n,m}$ and measure the output of the system $d_{n,m}$. The correction $\text{correct}_{n,m}$ could then be implemented for instance as a look-up table or appropriately parameterized function, which is defined in a way which ensures that for each input $c_{n,m}$ the corrected output $d'_{n,m}$ corresponds to the designer's expectation.

Such an explicit calibration necessitates the camera to be in a controlled environment and the use of special hardware. A further problem is that the characteristic curves $\text{nonlin}_{n,m}$ are not stable over time. Instead, they vary for instance due to temperature dependencies. Therefore an explicit calibration is no good option for performing the proposed correction.

Instead of an explicit calibration, it is proposed in an embodiment of the present invention to perform an implicit calibration of the characteristic curves $\text{nonlin}_{n,m}$. This means each channel is corrected in a way which satisfies equation (3) without explicitly knowing $c_{n,m}$. Descriptively formulated this means that instead of using the uncorrected output value, the relation of two uncorrected output values $d_{n1,m1}$ and $d_{n2,m2}$ is analyzed (n1, n2$\in\{1, \ldots, N\}$ and m1, m2$\in\{1, \ldots, M\}$). This enables the definition of a rectification operator r, which corrects the values to ensure $d'_{n1,m1}=d'_{n2,m2}$. Since this problem is underdetermined, it is sufficient to only correct one value, the second value remains uncorrected (e.g. $d'_{n2,m2}=d_{n2,m2}$).

Without loss of generality m=1 is chosen as the detection unit, which remains uncorrected. All other detection units are corrected for each possible sampling mode n using a rectification operator $r_{n,m}$:

$$d'_{n,m}=r_{n,m}(d_{n,m})=r_{n,m}(\text{nonlin}_{n,m}(c_{n,m}))$$

$$r_{n,m}(d_{n,m})=d'_{n,m}=d_{n,m},$$

if m=1 (no correction), for each n$\in\{1, \ldots, N\}$, i.e. $d'_{n,1}=d_{n,1}=\text{nonlin}_{n,1}(c_{n,1})$, and $$d'_{n,m}=r_{n,m}(d_{n,m})=r_{n,m}(\text{nonlin}_{n,m}(c_{n,m}))=r_{n,1}(\text{nonlin}_{n,1}(c_{n,1}))=d'_{n,1} \quad (4)$$

for each possible $c_{n,1}$, and $c_{n,m}=c_{n,1}$, n$\in\{1, \ldots, N\}$,
if m$\neq$1 (correction in all other cases)

This means that there are (M−1)*N independent non-trivial and N trivial rectification operators $r_{n,m}$. The rectification operators seek to compensate deviations caused by the different detection units (m) individually for each sampling mode (n). It is to be noted that this definition defines $r_{n,m}$ only implicitly. It will be shown below how $r_{n,m}$ is constructed.

In a further embodiment of the present invention the usage of an algorithm for ToF data enhancement is proposed. It may be divided into two "main" routines, a calibration routine and a rectification routine as shown in FIG. 4. The calibration routine addresses the problem of selecting appropriate raw data, preparing the data for computation of r (including the steering of the hardware, if possible), and generation of r.

Figure 4A:
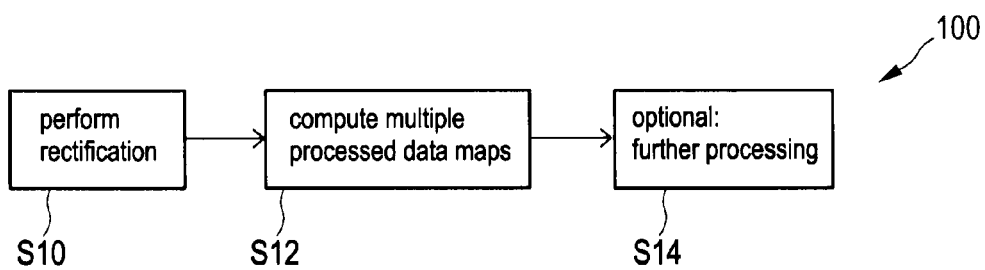
FIG. 4 shows essential steps of a method according to the present invention.

The rectification routine 100 schematically shown in FIG. 4A addresses the problems of performing (S10) the rectification of data (i.e. executing the rectification operator: $d'_{n,m} = r_{n,m}(d_{n,m})$), computing (S12) multiple processed data sets (e.g. depth maps), and optionally performing (S14) further processing (e.g. averaging of multiple sets of prior step, to compute a single set of superior quality)

Figure 4B:
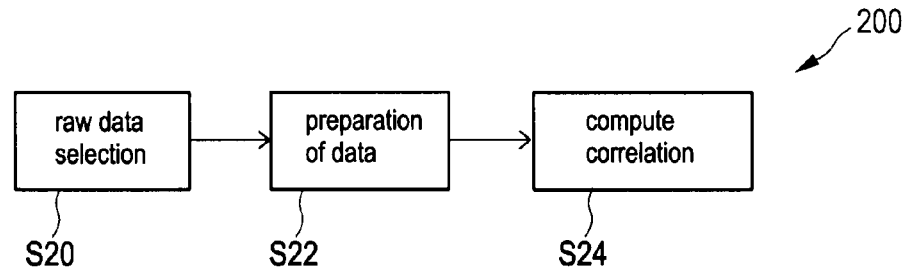

Goal of the calibration routine 200 schematically shown in FIG. 4B is the generation of function r usable for rectification of ToF data. It may be divided into three subroutines, in particular raw data selection (S20), preparation of data (S22), and generation of r (S24).

The subroutine raw data selection (S20) eliminates raw data samples which would disturb the process of generating r. This is done by detecting erroneous measurements and annotating the data as not usable for the further processing. The detection of erroneous measurements may include especially:

the detection of under- and overexposed measurements (e.g. by thresholding the data: data <5% or >95% of the typical measurement range is annotated as not usable, wherein the thresholds are not fixed, also others might be appropriate, depending on the given ToF system), the usage of calibration data acquired in prior (e.g. maps containing information about typically saturated detection units (similar to hot pixels), underexposed detection units (similar to dark pixels), typically underexposed or saturated detection units (similar to blinking pixels)), the usage of knowledge gathered in a prior run of the rectification routine (e.g. detection units found to give inconsistent results for the generation of r, which are only available if a prior run of the rectification routine took place), the usage of reliability maps generated by other components of the ToF system (e.g. computed by the manufacturers firmware or third-party libraries), the usage of information to detect temporal data discontinuities, the usage of information to detect motion artifacts, and the usage of further information of the ToF system which indicates a likely disturbance of the process of generating r (e.g. external sensors, for instance a temperature sensor which detects a temperature shock, or an accelerometer detecting a physical shock of the system, or internal sensors, for instance detecting the activation of systems for suppressing ambient light).

The data annotated as not usable is then simply being excluded from the further processing. Another option is to delete the data from a set of available data, and use only the remaining data as input for the following processing.

The subroutine preparation of data (S22) aims to prepare the data for the following process of generating r. This preparation task can be described as answering the following question: "For a given theoretical input $c_{n,m}$ and measurement $d_{n,m}$ (measured by detection unit m in sampling mode n), what would have been measured (as $d_{n,1}$) by detection unit 1 in the same sampling mode, if the same theoretical input $c_{n,1} = c_{n,m}$ would have been present?", i.e. for a given $c_{n,m}$, $d_{n,m}$ with $m \neq 1$, find $d^*_{n,1} = \mathrm{nonlin}_{n,1}(c_{n,m})$.

This is not trivial, because in current ToF systems different detection units m typically do not run the same sampling mode n simultaneously. I.e. if data is necessarily acquired by different detection units m running the same sampling mode n, this data is typically acquired in different subframes 1. Since subframes are acquired consecutively, the scene content may have changed, so in this typical case the following is generally valid:

$$c_{n,m} \neq c_{n,1}.$$

For this reason, $d^*_{n,1}$ is not measurable directly, but has to be estimated or constructed. When found, the pair $(d_{n,m}, d^*_{n,1})$ is given into the next module for generation of r.

One possibility to estimate $d^*_{n,1}$ is to assume that the scene does not change during the timespan used for collecting the raw data (i.e. the scene content imaged by the respective pixel is static). Then, it can be assumed that $$c_{n,m} = c_{n,1}$$

$$=> d_{n,1} = \mathrm{nonlin}_{n,1}(c_{n,1}) = \mathrm{nonlin}_{n,1}(c_{n,m}) = d^*_{n,1}.$$

So, pairs of $(d_{n,m}, d^*_{n,1})$ can be found.

The assumption of "static scenes" can be ensured by appropriate filtering in the raw data selection module. For instance, discarding all raw data values, of which the absolute temporal gradient exceeds a predefined threshold in a range of some frames, would guarantee that only (locally) static scenes are used for this computation.

Many applications, for instance in the field surveillance, medical ToF imaging or gaming, produce data which contain enough static subsequences for each pixel over timespans of several minutes. So this strategy would be successful.

There are ToF applications in which waiting for static subsequences could be disadvantageous because of the time until enough data is collected to generate a sufficiently good rectification operator r. This is especially the case in applications, where static subsequences are quite rare, e.g. in the field of automotive, where a ToF system could image the outside scenery, which is potentially moving for hours.

Figure 5:
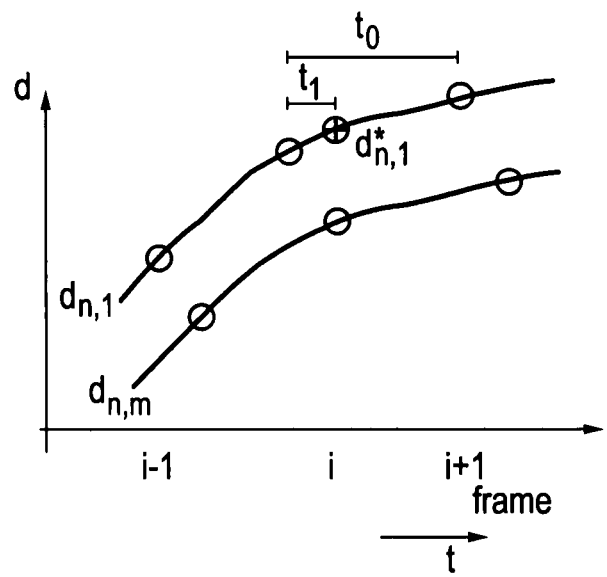
FIG. 5 shows a diagram illustrating the temporal progression of the output of two detection units, plotted over the number of the frame.

In such cases, constructing $d^*_{n,1}$ would be advantageous. This can be done for instance by temporal interpolation using a polynom of degree Q (Q≥1). For instance, Q=1 would be a linear interpolation. As an example, this will be explained using FIG. 5: The diagram shows the temporal progression of the output $d_{n,1}$ and $d_{n,m}$, plotted over the number of frame f. The solid curves represent a possible progression of $d_{n,1}$ and $d_{n,m}$. The circles represent the measurements of these quantities in each frame. Even if $d_{n,1}$ and $d_{n,m}$ are acquired in the same frame, they are not acquired at exactly the same time (cf. FIG. 3).

Let $t_1$ be the difference between both acquisitions and $t_0$ the temporal distance of two consecutive frames. By linearly interpolating between $d_{n,1,f=i}$ and $d_{n,1,f=i+1}$ this gives $d^*_{n,1}$ as:

$$d^*_{n,1} = d_{n,1,f=i} + (t_1/t_0)(d_{n,1,f=i+1} - d_{n,1,f=i}).$$

So again, pairs of $(d_{n,m}, d^*_{n,1})$ can be found.

The time constants $t_0$ and $t_1$ are typically known to the designers of a ToF system. If not, estimations based on the given hardware can be made, for instance $t_1 = 0.5 \, t_0$. If this is not possible, the strategy of usage of static scenes explained above should be employed.

Next, a simplified model and rectification will be explained. The assumed underlying physical model explained in equation (2.1) is capable to model deviations caused by the different detection units (m) individually for each sampling mode (n). It can be advantageous to simplify this model in certain scenarios. For instance, if for a given ToF system the different detection units show deviations which are independent of the sampling mode, it simplifies to $$c_{n,m} \rightarrow \mathrm{nonlin}_m \rightarrow d_{n,m} \quad (2.2)$$

This leads to a simplified rectification operator $r_m$ (compare to equation (4)):

$$d'_{n,m} = r_m(d_{n,m}) = r_m(\mathrm{nonlin}_m(c_{n,m}))$$

$$r_m(d_{n,m}) = d'_{n,m} = d_{n,m}$$

if m=1 (no correction), for each n∈{1, ..., N}, i.e. $d'_{n,1} = d_{n,1} = \text{nonlin}_1(c_{n,1})$ $$d'_{n,m} = r_m(d_{n,m}) = r_m(\text{nonlin}_m(c_{n,m})) = r_1(\text{nonlin}_1(c_{n,1})) = d'_{n,1} \quad (5)$$

for each possible $c_{n,1}$, and $c_{n,m} = c_{n,1}$, n∈{1, ..., N}, if m≠1 (correction in all other cases).

Next, calibration strategies based on hardware control will be explained. The preceding calibration strategies based on static or moving scenes are entirely passive methods: They are capable to work with data acquired by an off-the-shelf ToF system. In the following other methods will be explained which incorporate a partial modification of the mode of operation of the used ToF system. The goal of these approaches is to temporarily disable the system to measure different quantities $c_{n,m}$ by each detection unit. Thus, two acquisitions $c_{n1,m1}$ and $c_{n2,m2}$ acquired by different detection units $m_1$ and $m_2$ in a single subframe 1 are equal:

$$c_{n1,m1} = c_{n2,m2}, n_1, n_2 \in \{1, \ldots, N\}, m_1, m_2 \in \{1, \ldots, M\},$$

if both are acquired simultaneously (same 1).

For ToF systems for which the assumption of the simplified model is valid (see equation (2.2)), this means especially $$c_{n,m} = c_{n,1}$$

$$\Rightarrow d_{n,1} = \text{nonlin}_m(c_{n,1}) = \text{nonlin}_m(c_{n,m}) = d^*_{n,1}.$$

So, pairs of $(d_{n,m}, d^*_{n,1})$ can be found very easily, without the need of temporal interpolation or detection of static subsequences.

Possible methods for temporarily disabling the ToF system to measure different quantities $c_{n,m}$ include methods for manipulating the light source, methods for manipulating the sampling mode of the detection units and methods for manipulating the synchronization between radiation source and detection units.

Methods manipulating the light source aim at a deactivation of the modulation, i.e. using the light source to emit non-modulated radiation, or preventing the light source from emitting radiation. The latter may be achieved for instance by switching off the light source, or physically hindering generated radiation from illuminating the scene, e.g. by using a shutter. If using non-modulated radiation, the consecutive use of different intensities may be beneficial to rapidly collect data necessary to construct r (this will be explained below). If using no radiation, the typically varying scene content guarantees the collection of distinct data samples to construct r. However, for this option ambient light has to be present (which is the case in most, but not all applications).

Using data collected during timespans where the light source is switched off is especially of interest, since today's ToF systems typically use a burst mode for running its radiation sources. Burst mode means the radiation source is not running continuously, but switched on and off alternating. The reasons for this switching are that this allows a mean emittance to stay low (providing eye safety) while peak emittance is high, thus leading to a better ratio of active light to ambient light (in active phases), and that the radiation source (e.g. LED) is allowed to cool down, enabling a higher drive current during active phase.

Methods manipulating the sampling mode of the detection units aim to set each detection unit into the same state of sampling. This includes to set all detection units into the same sampling mode n, or to ensure a deactivation of the sampling ability of the detection units, i.e. to disturb the demodulation process of the detection units. This includes methods for switching off the ability of the detection units to vary its sensitivity. In particular, the sensitivity may be set to a specific value. The consecutive use of different sensitivity values may be beneficial to rapidly collect data necessary to construct r. If a single sensitivity value is used, the typically varying scene content guarantees the collection of distinct data samples to construct r.

Methods for manipulating the synchronization between radiation source and detection units aim to disable a proper sampling of the incident modulated radiation by the detection units. This includes methods for varying the phase between the signal controlling the radiation source and the signal controlling the detection units. It furthermore includes methods to vary the frequency of one or the other signal, i.e. to mistune the frequencies of the signals.

All methods have to run only for a short amount of time, preferably between the acquisition of data samples for generating information about the scene (e.g. for acquiring depth maps), or during specific stages (e.g. shortly after activating the ToF system (boot time)).

Different of the presented methods may be combined. For instance, to enable a rapid collection of data needed for construction of r, setting the sensor's sensitivity to a constant value and varying the intensity of the radiation source (either modulated or non-modulated) might be a beneficial combination.

Next the routine for the construction of r (S24) will be explained. The rectification operator r is used to correct the measurements performed by the ToF system (see equation (4)). Ideally, the following is valid:

$$r_{n,m}(d_{n,m}) = d^*_{n,1} \quad (6)$$

It is possible to construct r from a multitude (set) of pairs $P = \{(d_{n,m}, d^*_{n,1})_i\}$ collected in the step preparation of data (S22). The construction should generate a rectification operator r, for which the equation (6) is valid for most of collected pairs of set P. The construction should be robust, and it should generalize P. Robust in that sense means, that some erroneous pairs should not degrade the quality of constructed r. Generalizing P means that missing pairs should not effect holes of constructed r.

To ensure that the generated r is performing a good correction for each possible $d_{n,m}$, P should contain data distributed over the whole range of possible data, i.e. $d_{n,m}$ of pairs in P should ideally be uniformly distributed. To effectively collect data fulfilling this condition, and thus enabling a rapid generation of r, methods like varying the intensity of the radiance source or varying the sensitivity of the detection units may be used (see the above explanation regarding the calibration strategies based on hardware control).

One possibility to generate r is to fit the dataset P, i.e. fitting $\{(d^*_{n,1})_i\}$ over $\{(d_{n,m})_i\}$. As fitting function, for instance a polynome of arbitrary degree g may be used. A bigger g increases the quality of the reconstruction process, but necessitates more pairs in P and a higher computational power. (g=0, 1 or 2 would be appropriate for most ToF systems.)

Figure 6:
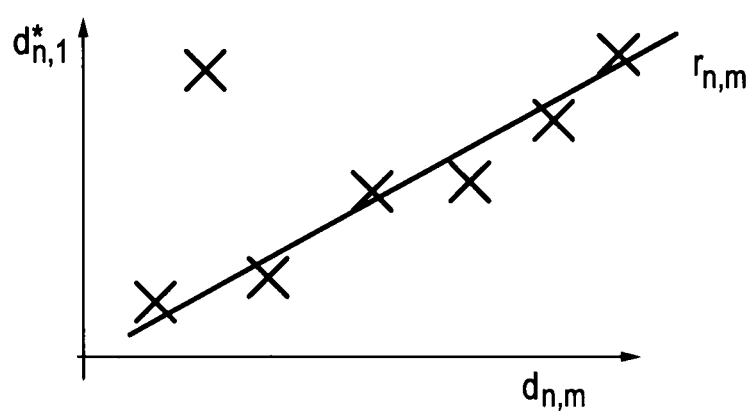
FIG. 6 shows a diagram illustrating a curve fitted to a number of output samples of a detection unit.

As fitting procedure, for instance the "method of least squares" could be used. To ensure a robust fitting process, methods like RANSAC or "least median of squares" could be used (as known from general literature). This is also illustrated in FIG. 6.

Although robust and generalizing rectification operators are desired, also functions without these properties may give good results in certain applications (e.g. simple deviations to be corrected, low computational power available to compute correction). Such a correction would be, for instance, a look-up table: Let L be a vektor: $L = \{l_1, l_2, \ldots l_v\}$, v=number of possible $d_{n,m}$ (typically limited due to limited digital resolution of the ToF system). For each pair of set P, set $L(d_{n,m})=d^*_{n,1}$. Then r can be set as $L: r_{n,m}(d_{n,m})=L(d_{n,m})=d^*_{n,1}$.

As mentioned, the characteristics of the nonlinearities may vary over time (for instance due to temperature shift). Thus, r should adapt to these changes, instead of showing a static behaviour. One possibility to ensure that r is flexible would be to limit the amount of pairs in P used for constructing r. A possibility would be to delete the oldest pair in P, each time a new pair is added.

If temporal adaptiveness is (temporarily) not needed (for instance because a sufficient stability of the ToF system is known), it may be beneficial to (temporarily) deactivate the corresponding routines to save computational resources, power, etc.

The rectification routine 100 (see FIG. 4A) performs the rectification of data using r, and processes this rectified data. As described in equation (4) the rectification is performed using the rectification operator r as $d'_{n,m}=r_{n,m}(d_{n,m})=d_{n,m}$, if $m=1$ (no correction), for each $n\in\{1,\ldots,N\}$ $d'_{n,m}=r_{n,m}(d_{n,m})$, for each $n\in\{1,\ldots,N\}$, if $m\neq 1$ (correction in all other cases).

Next, the processing of rectified data will be explained. The rectified data is mostly free of systematic deviations caused by the different nonlinear amplification paths. So, it may be processed directly, i.e. without performing averaging techniques as explained above and as performed in known methods. This enables the computation of more independent processed data values from the measured data of one frame. For instance in depth imaging, it is possible to generate depth maps at a higher frequency, which gives an increased frame rate, which is one of the main advantages of the present invention. This shall be explained by use of an example illustrating the doubling of the frame rate for cameras by PMDTechnologies.

Sensors used by PMDTechnologies employ, for instance, $M=2$ detection units per pixel. To acquire $N=4$ samples of the correlation function I, $L=2$ subframes would suffice. Using the averaging technique, $L=4$ subframes are necessary. Instead, using the proposed method of data value rectification, $L=2$ samples actually suffice.

Each sample of the correlation function corresponds to certain delay θ:

θ={0°,90°,180°,270°}

So for each of N=4 sampling modes, one delay θ is sampled:
n=1: θ=0°
n=2: θ=90°
n=3: ∴=180°
n=4: θ=270°.

The camera acquires two samples in parallel, which is done four times:
l=1: $d_{1,1}, d_{3,2}$
l=2: $d_{2,1}, d_{4,2}$
l=3: $d_{3,1}, d_{1,2}$
l=4: $d_{4,1}, d_{2,2}$.

Using the nomenclature as used above, this corresponds to:
l=1: $d_{1,1}=A_0$ $d_{3,2}=B_{180}$
l=2: $d_{2,1}=A_{90}$ $d_{4,2}=B_{270}$
l=3: $d_{3,1}=A_{180}$ $d_{1,2}=B_0$
l=4: $d_{4,1}=A_{270}$ $d_{2,2}=B_{90}$.

Here, the samples $d_{1,1}, d_{2,1}, d_{3,1}, d_{4,1}$ ($A_0, A_{90}, A_{180}, A_{270}$) acquired by the detection unit A form a first sample set and the samples $d_{1,2}, d_{2,2}, d_{3,2}, d_{4,2}$ ($B_0, B_{90}, B_{180}, B_{270}$) acquired by the detection unit B form a second sample set.

As an example, the rectification operator r is generated from a (live-) sequence as follows:

a) individually for each pixel, each detection unit and each sampling mode, static subsequences are searched by doing a preselection and a refinement:

a1) In the preselection step, all samples of time step t1, of which the squared temporal gradient is below a threshold ξ are accepted:

accept $d_{n,m,t1}$, if $(d_{n,m,t1}-d_{n,m,t0})^2<\xi$ with $d_{n,m,t0}$ and $d_{n,m,t1}$ being two consecutive values acquired at the time steps t0 and t1 (t0<t1) of one raw channel of one pixel. The threshold ξ is set for instance to 10% of the maximal value of a sample.

a2) In the following refinement step, samples of time step t1 are accepted if all samples acquired in time step t1 by the same pixel but other detection units and sampling modes were accepted in the preselection step. All other samples are discarded.

b) For each pixel, each sampling mode n, and m=2, a linear function (polynomial of degree 1) (7) is fitted to $\{(d_{n,1})_i\}$ over $\{(d_{n,2})_i\}$ using a least square fit, giving the rectification operator $r_{n,2}$ (8).

$$d_{n,1}=p_{n,m}+q_{n,m}*d_{n,m}, m=1, n\in\{1,\ldots,N\} \quad (7)$$

$$r_{n,2}(d_{n,m})=p_{n,m}+q_{n,m}*d_{n,m} \quad (8)$$

Here, $p_{n,m}$ is the offset and $q_{n,m}$ the slope of the rectification operator $r_{n,m}$.

A typical plot of collected data acquired in a certain sampling mode n, and a corresponding linear fit (represented as solid line) is given in FIG. 6. A computation of a rectification operator for m=1 is not required, since these samples are trivially corrected.

The rectification process corrects the data. Data acquired with detection unit m=1 (detection unit A) is trivially corrected:

$d'_{1,1}=r_{1,1}(d_{1,1})=d_{1,1}$, if m=1 (trivial correction), for each $n\in\{1,\ldots,N\}$
$d'_{2,1}=r_{2,1}(d_{2,1})=d_{2,1}$
$d'_{3,1}=r_{3,1}(d_{3,1})=d_{3,1}$
$d'_{4,1}=r_{4,1}(d_{4,1})=d_{4,1}$
$d'_{1,2}=r_{1,2}(\mathbf{42})=P_{1,2}+q_{1,2}*d_{1,2}$
$d'_{2,2}=r_{2,2}(d_{2,2})=p_{2,2}+q_{2,2}*d_{2,2}$
$d'_{3,2}=r_{3,2}(d_{3,2})=p_{3,2}+q_{3,2}*d_{3,2}$
$d'_{4,2}=r_{4,2}(d_{4,2})=p_{4,2}+q_{4,2}*d_{4,2}$.

Here, the samples $d_{1,1}, d_{2,1}, d_{3,1}, d_{4,1}$ ($A_0, A_{90}, A_{180}, A_{270}$) that are trivially corrected (i.e. uncorrected) form a first sample subset and the samples $d_{1,2}, d_{2,2}, d_{3,2}, d_{4,2}$ ($B_0, B_{90}, B_{180}, B_{270}$) that are to be corrected form a second sample subset. It should be noted here that generally a subset might also comprise samples from different sample sets (i.e. acquired with different detection units), and that the samples of more than one subset, in particular if a pixel comprises more than two detection units, are corrected as explained above.

From these eight samples, two independent phase images (giving two independent depth maps) may be computed using equation (2):

$\phi_1=\arctan[(d'_{4,2}-d'_{2,1})/(d'_{3,2}-d'_{1,1})]$ corresponding to $\phi_1=\arctan[(B'_{270}-A'_{90})/(B'_{180}-A'_0)]$ $\phi_2=\arctan[(d'_{4,1}-d'_{2,2})/(d'_{3,1}-d'_{1,2})]$ corresponding to $\phi_2=\arctan[(A'_{270}-B'_{90})/(A'_{180}-B'_0)]$ All data used for computation of $\phi_1$ was acquired in subframes (1) 1 and 2, while all data for computation of $\phi_2$ was acquired in subframes 3 and 4. So, both phase images represent different and independent estimations of the state of the scene.

Figure 7:
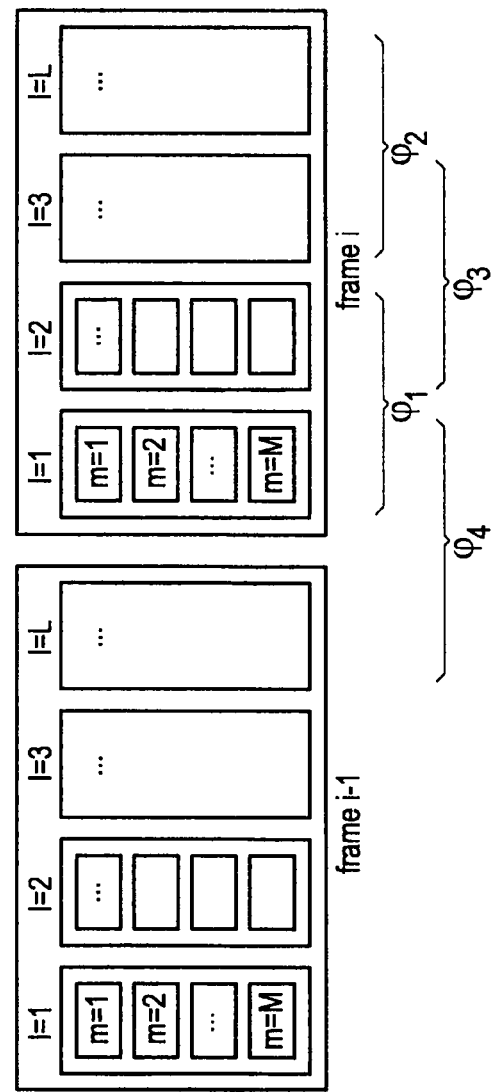
FIG. 7 shows illustrates which samples can be combined for determining an information value of scene related information.

Next, an example for interweaving frames shall be explained. By using interweaved subframes, the same camera even enables the computation of four phase images. This incorporates also two corrected measurements of the prior frame acquisition: Denoting $d'_{4,1}$ of the prior image $d'_{4,1,p}$, and $d'_{2,2}$ of the prior image $d'_{2,2,p}$. Then:

$$\phi_1 = \arctan[(d'_{4,2}-d'_{2,1})/(d'_{3,2}-d'_{1,1})]$$

corresponding to $\phi_1 = \arctan[(B'_{270}-A'_{90})/(B'_{180}-A'_0)]$ $$\phi_2 = \arctan[(d'_{4,1}-d'_{2,2})/(d'_{3,1}-d'_{1,2})]$$

corresponding to $\phi_2 = \arctan[(A'_{270}-B'_{90})/(A'_{180}-B'_0)]$ $$\phi_3 = \arctan[(d'_{4,2}-d'_{2,1})/(d'_{3,1}-d'_{1,2})]$$

corresponding to $\phi_3 = \arctan[(B'_{270}-A'_{90})/(A'_{180}-B'_0)]$ $$\phi_4 = \arctan[(d'_{4,1,p}-d'_{2,2,p})/(d'_{3,2}-d'_{1,1})]$$

corresponding to $\phi_4 = \arctan[(A'_{220,p}-B'_{90,p})/(B'_{180}-A'_0)]$
Here, the temporal order of the phase images is $\phi_4$, $\phi_1$, $\phi_3$, $\phi_2$ as shown in FIG. 7. Hence, four phase images can be computed from the data of a single frame. However, it shall be noted that the phase images are not completely independent here, since they employ partially the same data.

The processed data may be used for further processing. For instance, the computed phase images $\phi_1$, $\phi_2$ could be averaged to generate a single phase image $\phi_{single}$ $\phi_{single} = (\phi_1+\phi_2)/2$, (assuming an appropriate handling of the phase wrap), which could be used for computing a depth map of increased accuracy: This depth map would show less systematic deviations than a depth map computed using the technique of averaging raw data explained above.

In the above, the calibration and rectification routines have been explained in detail. In the following the question of an appropriate controlling of the execution of both routines will be explained.

The rectification routine necessitates the rectification operator r which is generated in prior. If the rectification routine is unknown, e.g. because no prior run of the execution routine took place (for instance, because the system was recently initialized), it may be beneficial to estimate r using parameters computed and stored at the last run of the system, or estimated, e.g. computed for similar ToF systems (same camera type), or similar operational states (for instance same exposure time), or environmental conditions (for instance same temperature).

If no or no reliable initialization of r can be loaded, it may be beneficial to forbid the execution of the rectification routine. In this case, the ToF system would still be able to provide data at lower framerates using averaging techniques described above.

Figure 8:
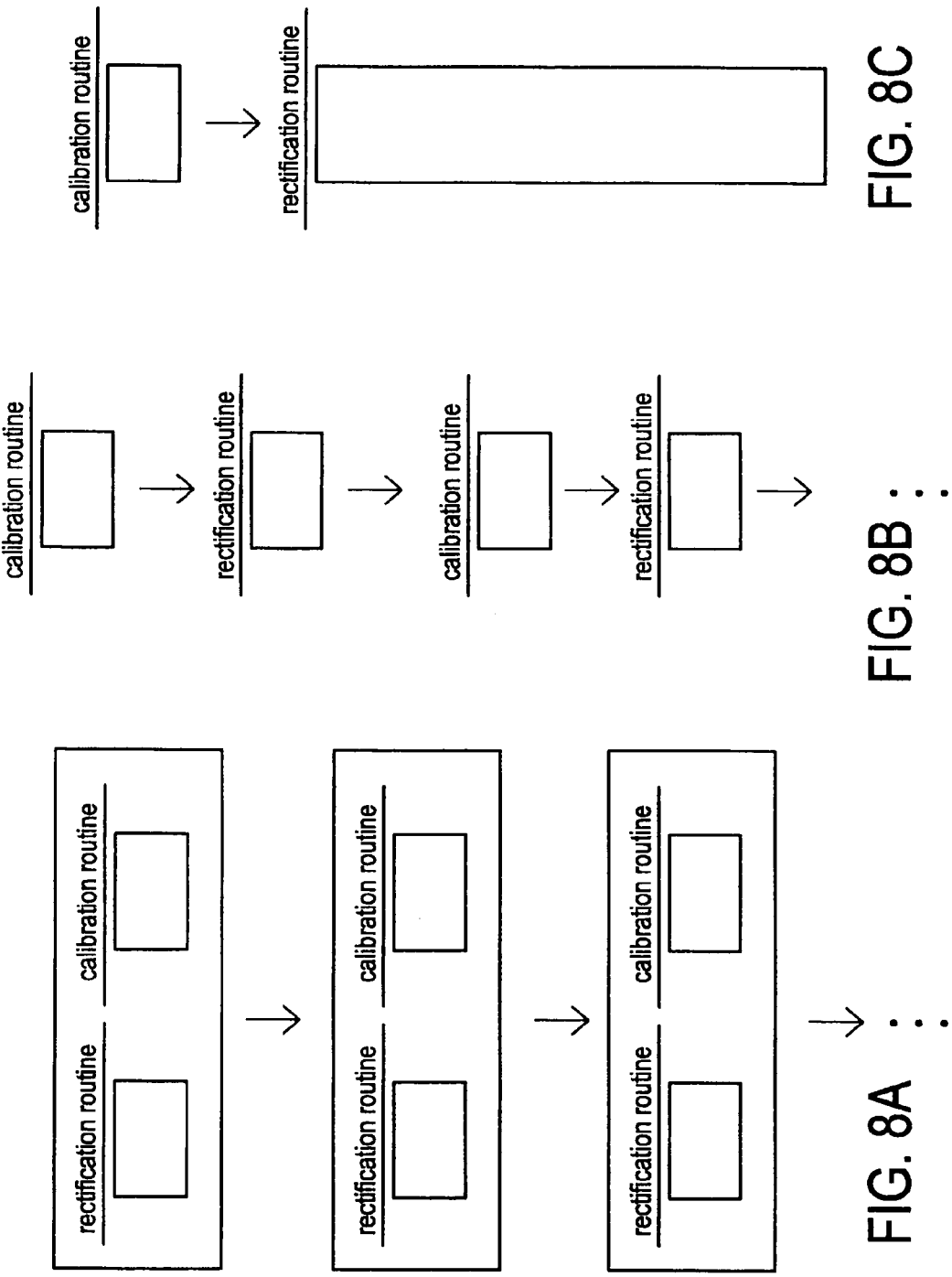
FIG. 8 shows further embodiments of a method according to the present invention.

The calibration and rectification routine may run consecutively or in parallel as shown in FIGS. 8A to 8C. The calibration routine can be run temporarily regular (i.e. after certain time periods) or irregular, for instance triggered by a certain event. Such event could be the detection of a variation of environmental parameters (for instance temperature, if temperature drift was found to influence the nonlinearity of the system), or the detection of an improper calibration (for instance, a discrepancy between different computed phase images).

The rectification routine can be started in parallel with the calibration routine, or can be started after a certain time or at a certain event after initializing the ToF system. The latter could help to ensure that the rectification operator r has reached a sufficient quality.

The rectification operator r may be computed separately for each pixel of the detector. It may change, and should possibly be re-initialized each time internal or external parameters of the ToF system change (e.g. exposure time, frame rate, temperature, operating voltage). However, it may be beneficial to not compute and apply individual rectification operators to save computational resources and time. This might be the case for instance in ToF systems, where different pixels, or different internal or external parameters do cause only negligible differences of individual rectification operators r.

The proposed correction has several advantages:

a) The averaging technique explained above is not necessary anymore. The generation of independent reconstructed values is feasible using less acquisitions (only L=rounding up (N/M) subframes instead of L≥M subframes). This enables higher output frame rates of processed data from the same amount of measured raw data. For example, in case of depth imaging, the proposed method enables the computation with multiple independent depth maps per frame.

b) The usage of less subframes L per generated map of scene information (e.g. depth map) reduces motion artifacts (because the scene changes less during complete acquisition of necessary data).

c) By using interweaved subframes, a frame of processed data could be generated for each acquired subframe (thus only L=1 subframe is necessary per frame, enabling a further boost of frame rate). Such frames are not independent anymore, because they have a 50% overlap with the next frame. Further, this method (interweaved frames) could also be applied using the averaging technique described above (i.e. it is possible without the proposed correction), but then the frames would be much more dependent (i.e. have a larger overlap, e.g. 75% overlap)].

d) Needing only L=rounding up (N/M) subframes per processed frame (instead of L=M using averaging above) means, that increasing M would actually give a benefit in terms of speed and reduction of motion artifacts. In other words: For future sensors such as a potential 4-tap detector (i.e. using M=4 detection units), the proposed correction is crucial since without this invention future 4-tap sensors would have the same speed as 2-tap sensors, i.e. they would bring no speed benefit.

e) The proposed correction improves the quality of processed frames compared to those generated using the averaging technique, if computed using the same data. I.e. without the need of an improved frame rate, it gives a better quality of data (in specific lower systematic error of uncalibrated processed frame).

Figure 9:
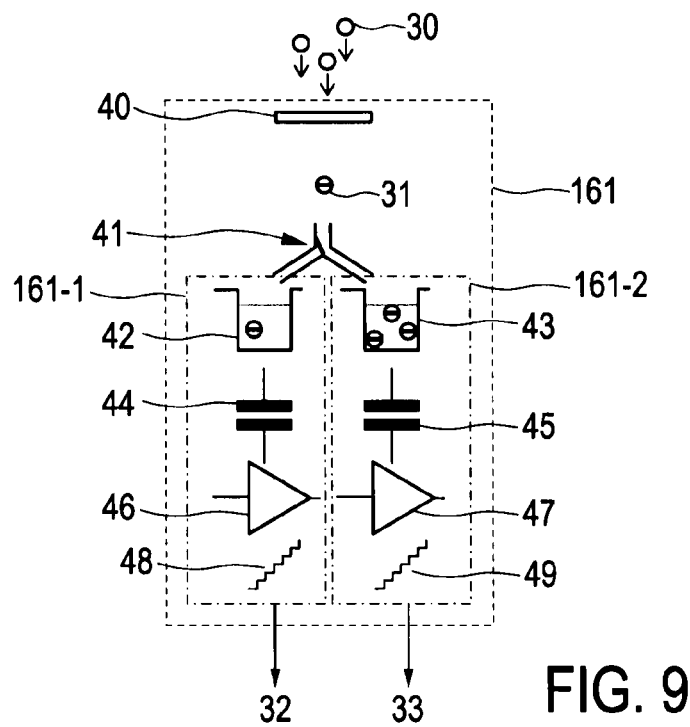
FIG. 9 shows a schematic diagram of a pixel comprising two detection units.

A simplified example shall illustrate an application of the present invention. Many ToF cameras use a special sensor, which employs two quantum wells per pixel to measure the correlation function of the detected optical signal with an electronic reference signal. As illustrated in FIG. 9, showing—as an example—a single pixel 161 comprising two detection units 161-1 and 161-2, incident photons 30 generate electrons 31 in a photosensitive element 40. The electrons 31 are sorted by a switch 41 into these two quantum wells 42, 43 (also referred to as quantum wells A and B herein), converted into a voltage by a conversion element 44, 45, amplified by an amplifier 46, 47, digitized by digitizers 48, 49 and given out as two digital values 32, 33. The switch 41 is synchronized with the light source (12 in FIG. 1), thus the two digital values 32, 33 correspond to two samples of the correlation function shifted by 180° against each other. By delaying the reference signal by a certain angle θ, the sensor (i.e. the detection units) is able to sample arbitrary points of the correlation function. Typically, θ is chosen as {0°, 90°, 180°, 270°}, the data acquired by both quantum wells A and B corresponds θ and θ+180°, respectively. This gives 8 samples: $A_0$, $A_{90}$, $A_{180}$, $A_{270}$ and simultaneously acquired $B_{180}$, $B_{270}$, $B_0$, $B_{90}$.

Figure 10:
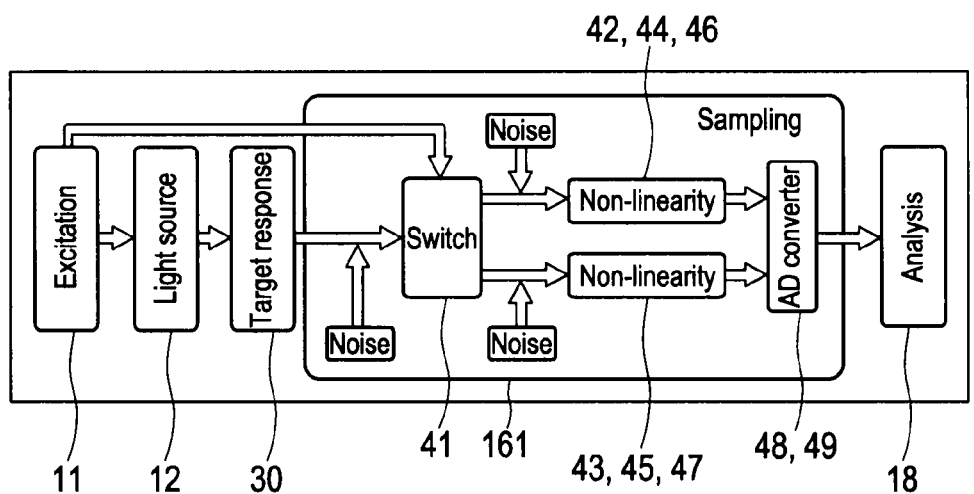
FIG. 10 shows a schematic diagram of a model used for description of the present invention.

It should be noted that each point θ is sampled twice (e.g. $A_0$ and $B_0$). The reason for that is the need for compensating sensor inhomogeneities. The quantum wells A and B and their amplification paths do not respond equally to light. This is illustrated in FIG. 10 schematically showing a model of the present invention provided with reference signs as used particularly in FIGS. 1 and 9.

If there is some knowledge about the scene, also a detection using two samples in each set is feasible, for instance if the intensity of the non-modulated light is known (i.e. that there are two unknowns, in particular phase shift and amplitude in case of the acquisition of depth images). This is, for instance, the case in Fluorescence Lifetime Imaging (FLIM), a ToF application other than depth imaging, where the phase shift of a specimen is measured using a microscope, to estimate environmental parameters (temperature, oxygen concentration, . . . ), etc. In this application, ambient light is typically not present, and the characteristics of the light source (in particular the intensity of its non-modulated radiation) are well known. In principle, the present invention may be applied also for FLIM applications.

Using more than three samples may also have advantages for some applications. For instance in FLIM applications, it enables the separation of multiple mixed phases. In depth imaging it enables the correction of higher harmonics of the radiation source. In general, however, there is no upper limit for the number of samples in a set.

The invention preferably uses a detector having a plurality of pixels, preferably arranged as an array. However, in some applications a detector having only a single pixel may be used. In this case the 3D ToF camera is actually to be understood as a camera delivering only (one-dimensional) depth information but no information in the other two directions.

Any kind of electromagnetic radiation may be used in the device and method according to the present invention. This includes more than just the visible spectrum, e.g. x-Ray, ultraviolet, infrared, terahertz, microwave and radio. For most kinds of radiation (particularly except ultraviolet, infrared and visible light) a modified detector should be used (particularly other than pure silicon, including for instance converters (X-ray to visible light) or micro-antennas (e.g. for terahertz radiation)).

Preferably, the evaluation unit is operable to generate scene-related information about the distance of one or more objects of the scene, the reflectivity of one or more objects of the scene and/or the intensity of ambient radiation, in particular of ambient light. However, other scene-related information may also be generated by use of the present invention.

For instance, a very primitive ToF sensor (i.e. detector) could recognize objects entering a certain depth range, without explicitly computing their depth (e.g. by comparing sensor raw data with predefined thresholds). Such a system could also use the invention.

Further, the invention may be used in FLIM applications. Such a FLIM setup is typically based on a fluorescence microscope, using a source of radiation (e.g. LASER or LED) to illuminate a specimen with electromagnetic radiation of a certain wavelength. The specimen contains substances (e.g. dyes) which are able to fluorescence, meaning these substances are able to absorb light of a certain wavelength (preferable corresponding to the light sources wavelength), and, after a certain time delay, emit light of another wavelength. Since this decay is a quantum process, said time delay is defined by a decay time, which is the most probable delay time for a multitude of fluorescent particles. Decay times may lie in the range of hours to attoseconds ($10^{-18}$ s). Typical decay times used for FLIM are in the range of 1 ms to 1 ns. In a FLIM setup the light source is controllable, and the detector is able to perform a measurement which enables the computation of this decay time. For instance, a continuous-wave ToF detector could be used to measure the phase shift between the incident fluorescent light and the light source signal, enabling the computation of decay times. If a detector is used which comprises a multitude of pixels, such measurement of the decay time could be spatially resolved. Special dyes exist, of which the decay time depends on environmental parameters. For instance, there are dyes with the decay time depending on the local oxygen concentration, the temperature, the pressure, etc. By using such dyes in or near the specimen, the measurement of these environmental parameters gets feasible. It should be noted, however, that there might exist setups of FLIM which do not employ ToF technique.

Another field of application of the invention is Pressure Sensitive Paint (PSP). Pressure sensitive paint is used for instance in aerodynamic experiments, for measuring the air pressure on the surface of a model remotely. The principle is very similar to FLIM: A specimen is painted with a substance which contains a dye, which has a decay time depending on the local air pressure. By measuring the decay time it is possible to estimate the local pressure, which is important information for aerodynamic experiments. Typical decay times used for PSP are in the range of 1 ms to 1 ns. It should be noted, however, that there might exist setups of PSP which do not employ ToF technique.

The proposed solution may be applied for data acquired by all kind of time-of-flight cameras, including pulse-based and continuous-wave systems. In summary, the present invention enables an increased framerate of ToF cameras using multiple detection units by factor two or more, without modifications of hardware and without introducing additional systematic errors. Motion blur is reduced, because the effective acquisition time per depth map decreases. This also decreases dynamic motion artifacts. Future ToF sensors with more taps have advantages compared to current sensors, if using the present invention which enables a speedup equal to M for the generation of independent maps of processed data.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

The invention claimed is:

1. A 3D time-of-flight camera for acquiring information about a scene, in particular for acquiring depth images of a scene, information about phase shifts between a reference signal and incident radiation of a scene or environmental information about the scene, said camera comprising:
   a radiation source that generates and emits electromagnetic radiation for illuminating said scene,
   a radiation detector that detects electromagnetic radiation reflected from said scene, said radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, and
   evaluation circuitry that evaluates said sample sets of said two or more detection units and generates scene-related information from said sample sets, wherein said evaluation circuitry comprises:
      rectification circuitry that rectifies a subset of samples of said sample sets by use of a predetermined rectification operator defining a correlation between samples detected by two different detection units of a particular pixel, and
      information value calculator circuitry that determines an information value of said scene-related information from said subset of rectified samples and the remaining samples of the sample sets.

2. The 3D time-of-flight camera as claimed in claim 1, wherein said radiation detector is adapted to sample a correlation function of the incident electromagnetic radiation and a reference signal, wherein a sample set comprises two or more samples of said con elation function for different phase shifts between the incident electromagnetic radiation and the reference signal, in particular for equidistant phase shifts.

3. The 3D time-of-flight camera as claimed in claim 1, wherein said radiation detector comprises per pixel a sensor element that converts incident electromagnetic radiation into electrons and a switch that is synchronized with said radiation source and sorts said electrons into said two or more detection units.

4. The 3D time-of-flight camera as claimed in claim 3, wherein said detection units each comprise a quantum well that stores electrons, a converter that converts the stored electrons into a voltage signal, an amplifier that amplifies said voltage signal and an analog-digital converter that digitizes the voltage signal.

5. The 3D time-of-flight camera as claimed in claim 1, wherein said rectification circuitry is adapted to rectify all samples of said sample sets, in particular except for samples detected by one of said two or more detection units used for detecting the samples of said sample sets.

6. The 3D time-of-flight camera as claimed in claim 1, wherein said rectification operator represents a polynomial fit, in particular of degree 0, 1 or 2, to pairs of samples detected by two different detection units of a particular pixel.

7. The 3D time-of-flight camera as claimed in claim 1, further comprising:
   rectification operator generator circuitry that generates said rectification operator by fitting a polynomial fit, in particular of degree 0, 1 or 2, to pairs of samples detected by two different detection units of a particular pixel, in particular samples of substantially static areas of the scene.

8. The 3D time-of-flight camera as claimed in claim 7, wherein said radiation detector is adapted to sample a correlation function of the incident electromagnetic radiation and a reference signal, wherein a sample set comprises two or more samples of said correlation function for different phase shifts between the incident electromagnetic radiation and the reference signal, in particular for equidistant phase shifts, and
   wherein said rectification operator generator circuitry is adapted to generate said rectification operator by fitting a polynomial fit, in particular of degree 0, 1 or 2, to pairs of samples detected for identical sampling modes of two different detection units of a particular pixel.

9. The 3D time-of-flight camera as claimed in claim 1, wherein said rectification circuitry is adapted to use pixel-individual rectification operators for rectification of samples detected by all but one detection unit of a pixel or to use the same rectification operator for rectification of samples of all pixels.

10. The 3D time-of-flight camera as claimed in claim 1, wherein said radiation source is operable to emit electromagnetic radiation in the wavelength range from 1 nm to 1 cm, in particular to emit infrared, visible or ultraviolet light.

11. The 3D time-of-flight camera as claimed in claim 1, wherein said evaluation circuitry is operable to generate scene-related information about the distance of one or more objects of the scene, the reflectivity of one or more objects of the scene and/or the intensity of non-modulated radiation, in particular comprising of ambient light and non-modulated light of the radiation source, reflected by the scene.

12. The 3D time-of-flight camera as claimed in claim 1, wherein said radiation source is operable to continuously emit electromagnetic radiation and wherein said information value calculator is operable to determine said information values based on phase information of light reflected from the scene, resulting in a modification of said samples from said set of at least two subsequent samples of the same pixel signal.

13. The 3D time-of-flight camera as claimed in claim 1, wherein said radiation source is operable to emit radiation pulses and wherein said information value calculator is operable to determine said information values based on intensity information of said samples from said set of at least two subsequent samples of the same pixel signal.

14. The 3D time-of-flight camera as claimed in claim 1, further comprising:
   control circuitry that temporarily disables the camera to measure different quantities by said detection units, in particular by controlling said radiation source, the sampling mode of the detection units, the synchronization between the radiation source and the detection units, and/or a radiation path of radiation incident at the radiation detector.

15. A 3D time-of-flight method for acquiring information about a scene, in particular for acquiring depth images of a scene, information about phase shifts between a reference signal and incident radiation of a scene or environmental information about the scene, said method comprising the steps of:
   generating and emitting, by an electromagnetic radiation source, electromagnetic radiation for illuminating said scene,
   detecting electromagnetic radiation reflected from said scene by a radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, evaluating, by evaluating circuitry, said sample sets of said two or more detection units and generating, by generating circuitry, scene-related information from said sample sets, wherein said step of evaluating comprises the sub-steps of:

rectifying a subset of samples of said sample sets by use of a predetermined rectification operator defining a correlation between samples detected by two different detection units of a particular pixel, and determining an information value of said scene-related information from said subset of rectified samples and the remaining samples of the sample sets.

16. A processor for use in a 3D time-of-flight camera for acquiring information about a scene, in particular for acquiring depth images of a scene, information about phase shifts between a reference signal and incident radiation of a scene or environmental information about the scene, said 3D time-of-flight camera comprising a radiation source that generates and emits electromagnetic radiation for illuminating said scene, and a radiation detector that detects electromagnetic radiation reflected from said scene, said radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, said processor being operable to evaluate said sample sets of said two or more detection units and generates scene-related information from said sample sets, wherein said processor comprises:

a rectification circuitry that rectifies a subset of samples of said sample sets by use of a predetermined rectification operator defining a correlation between samples detected by two different detection units of a particular pixel, and information value calculator circuitry that determines an information value of said scene-related information from said subset of rectified samples and the remaining samples of the sample sets.

17. A processing method for use in a 3D time-of-flight method for acquiring information about a scene, in particular for acquiring depth images of a scene, information about phase shifts between a reference signal and incident radiation of a scene or environmental information about the scene, said 3D time-of-flight method comprising the steps of generating and emitting electromagnetic radiation for illuminating said scene, and detecting electromagnetic radiation reflected from said scene by a radiation detector comprising one or more pixels, in particular an array of pixels, wherein said one or more pixels individually detect electromagnetic radiation reflected from said scene, wherein a pixel comprises two or more detection units each detecting samples of a sample set of two or more samples, said processing method being operable for evaluating said sample sets of said two or more detection units and generating scene-related information from said sample sets, wherein said processing method comprises the steps of:

rectifying, by rectifying circuitry, a subset of samples of said sample sets by use of a predetermined rectification operator defining a correlation between samples detected by two different detection units of a particular pixel, and determining, by determining circuitry, an information value of said scene-related information from said subset of rectified samples and the remaining samples of the sample sets.

18. A non-transitory computer-readable medium having instructions stored thereon which, when carried out on a computer, cause the computer to perform the steps of the method as claimed in claim 17.

* * * * *